Oct. 3, 1933.    W. S. FISHER    1,929,398
OILING SYSTEM
Original Filed Aug. 14, 1922    3 Sheets-Sheet 2
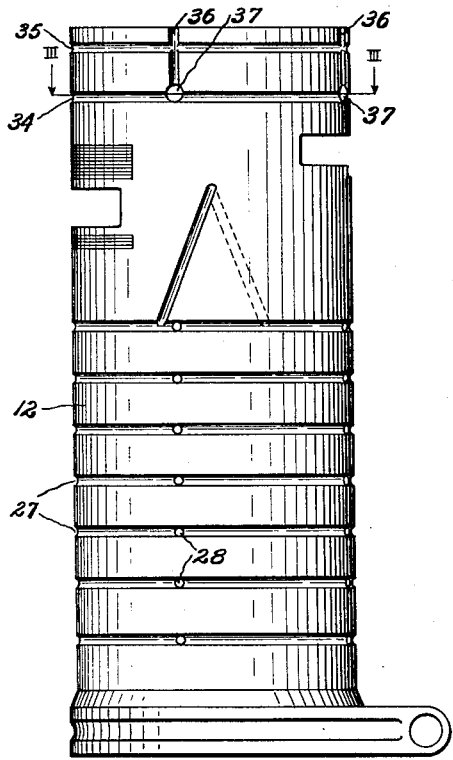
Fig. II.
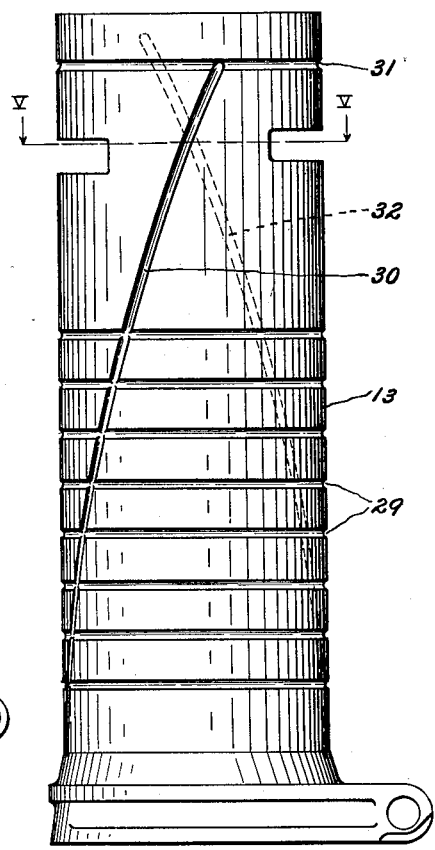
Fig. IV.
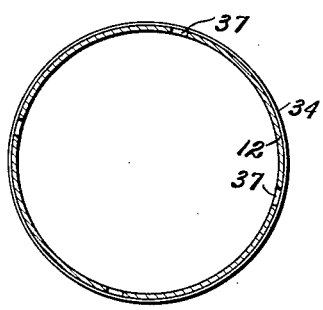
Fig. III.
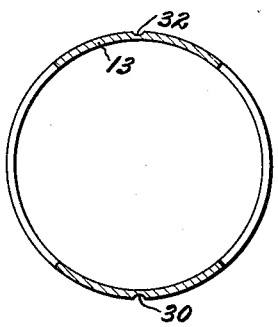
Fig. V.
INVENTOR.
Walter S. Fisher
BY Chester H. Braselton
Solon J. Boughton
ATTORNEYS.

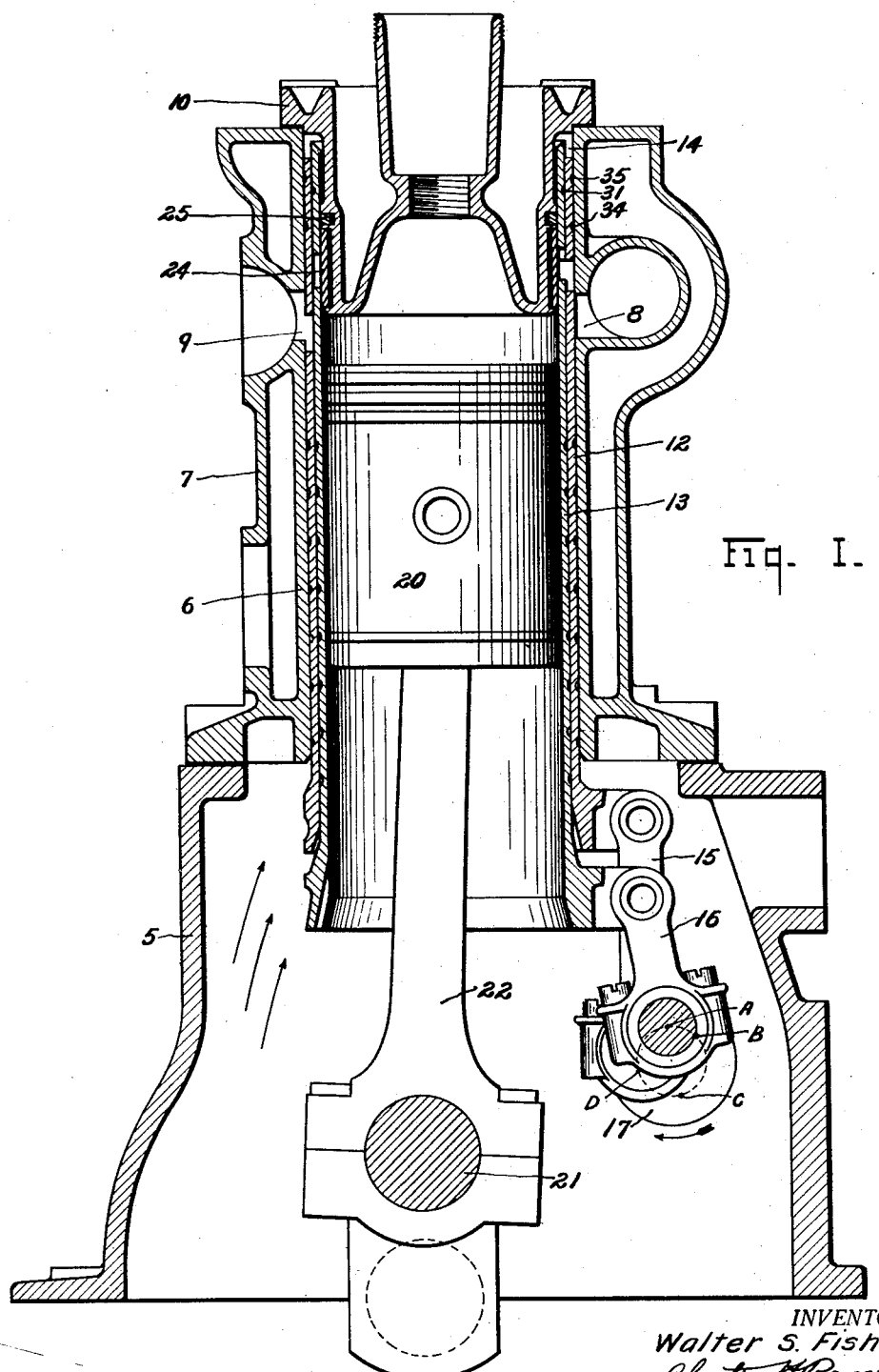
Oct. 3, 1933.  W. S. FISHER  1,929,398
OILING SYSTEM
Original Filed Aug. 14, 1922    3 Sheets-Sheet 1
Fig. I.
INVENTOR.
Walter S. Fisher
BY Chester M Braselton
Solon J Boughton
ATTORNEYS.

Oct. 3, 1933. W. S. FISHER 1,929,398
OILING SYSTEM
Original Filed Aug. 14. 1922   3 Sheets-Sheet 3
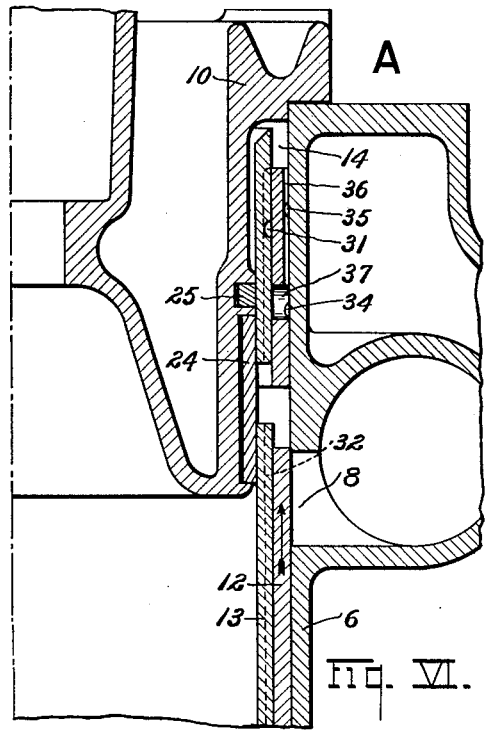
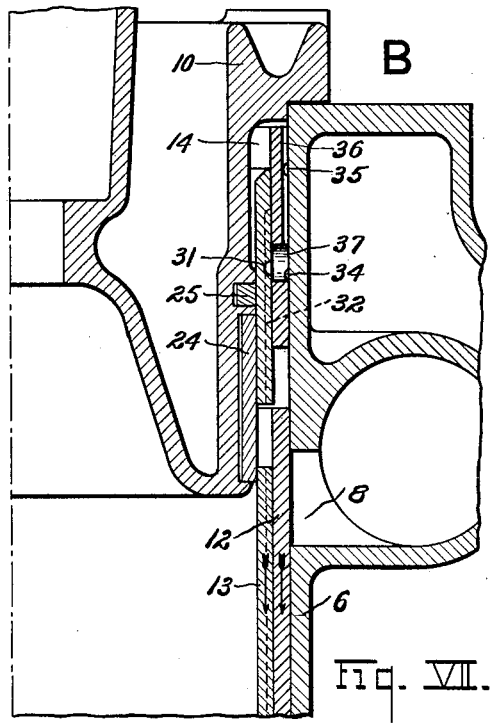
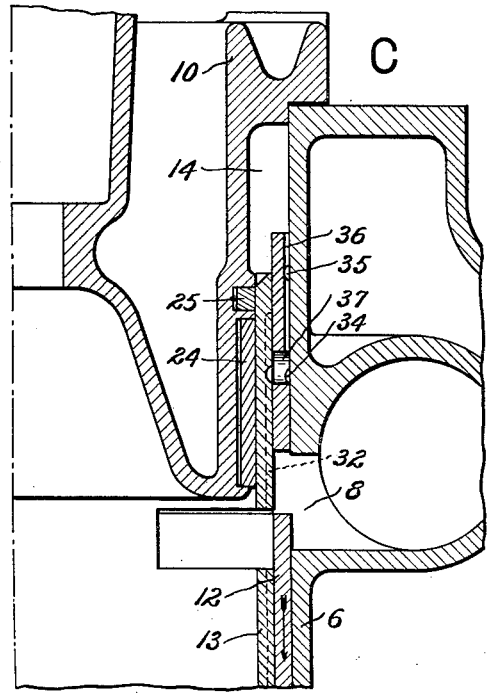
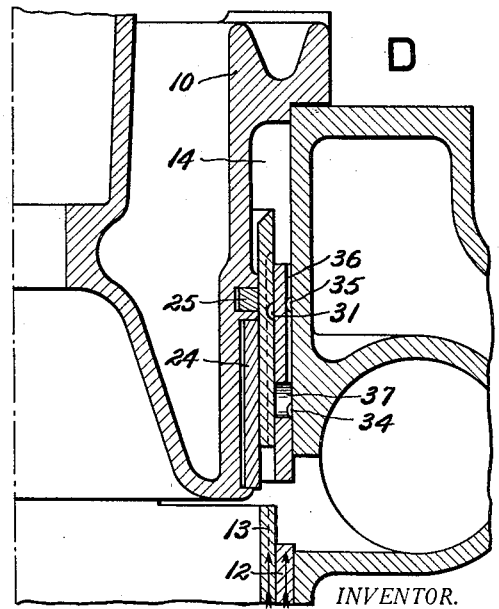
INVENTOR.
Walter S. Fisher
BY Chester W. Braselton
Solon J. Broughton
ATTORNEYS.

Patented Oct. 3, 1933

1,929,398

UNITED STATES PATENT OFFICE 1,929,398

OILING SYSTEM

Walter S. Fisher, Toledo, Ohio, assignor to The Willys Overland Company, Toledo, Ohio, a corporation of Ohio Application August 14, 1922, Serial No. 581,607
Renewed April 11, 1928

30 Claims. (Cl. 123—188)

This invention relates to an internal combustion engine of the sleeve valve type and has special reference to the lubrication of the sleeves.

An object of the invention is the provision of suitable means whereby lubricant is drawn up from the crank case by the movement of the sleeves and supplied in proper quantities to the sliding faces thereof. In carrying out my invention, I provide the outer face of the inner sleeve with peripheral and longitudinal grooves and also provide the outer face of the outer sleeve with a peripheral groove or grooves near its upper end, as well as a number of holes extending through the sleeve and communicating with said groove or grooves. These grooves and holes are so related that at certain points in the cycle of the engine, the suction in the cavity or space above the sleeves, due to the simultaneous downward movement thereof, draws up lubricant through one longitudinal groove into the cavity above the sleeves, which lubricant subsequently is forced out and returned in part to the crank case through another longitudinal groove. The sleeves thus cooperate with the cylinder and cylinder head to constitute a pump for the circulation of lubricant from the crank case to the upper ends of the sleeves and back again, suitable transverse connecting grooves and openings being provided to distribute the lubricant about the wearing faces of the sleeves.

In the embodiment of my invention illustrated in the accompanying drawings and forming a part hereof:

Figure I is a vertical sectional view of an internal combustion engine of the sleeve valve type showing my invention applied thereto.

Fig. II is a side elevation of the outer sleeve of said engine.

Fig. III is a cross sectional view of the outer sleeve taken on the line III—III of Fig. II.

Fig. IV is a side elevation of the inner sleeve.

Fig. V is a cross sectional view of the inner sleeve taken on the line V—V of Fig. IV.

Figs. VI to IX inclusive are diagrammatic views drawn to a larger scale, showing the upper ends of the sleeves in their various relative positions corresponding to the positions A, B, C and D of the eccentric center for the inner sleeve.

The same reference numbers refer to the same parts throughout the views.

Referring to the drawings there is illustrated in Fig. I a common form of sleeve valve engine having an upper crank case section 5 upon which rests a cylinder 6 having a water jacket 7 and inlet and exhaust ports 8 and 9. A cylinder head 10 fits the top of the cylinder and for the most part lies within the upper portion of the cylinder, but spaced therefrom by the two sleeves 12 and 13, which project into an annular space or cavity 14. Each of these sleeves is provided with suitable gas ports which cooperate with one another and with the ports 8 and 9 to control the intake and the exhaust of the engine. Reciprocatory movement is imparted to the sleeves 12 and 13 by connecting links 15 and 16 driven by eccentrics on a shaft 17. A piston 20 slides within the inner sleeve and drives the crank shaft 21 through the connecting rod 22. A junk ring 24 and a narrow ring 25 both carried by the cylinder head make a gas tight joint with the adjacent sleeve. The outer surface of the outer sleeve 12 is shown provided with a series of parallel peripheral grooves 27 connecting with which are a number of small openings 28 through the wall of the sleeve. The outer surface of the inner sleeve 13 is similarly provided with a series of grooves 29. The grooves and openings in the sleeves serve to distribute and equalize the lubricating oil over the sliding surfaces. The construction thus far described is that common to engines of the well known Knight sleeve valve type, and it is an improvement in this construction whereby better lubrication is effected which comprises my invention.

In the operation of such an engine a certain amount of oil is splashed or thrown up by the connecting rod and crank against the outer surfaces of the sleeves, as indicated, for example, by the arrows in Fig. I. Heretofore this oil has been relied upon to work its way up between the two sleeves and between the cylinder and the outer sleeve to effectually lubricate the entire bearing surfaces thereof. By my invention I take advantage of the varying pressure in the space or cavity above the sleeves and by providing suitable grooves and openings in the sleeves cause the sleeves to act as a pump to produce a positive flow of oil from the crank case up to the top of the sleeves, around the inner sleeve, and back to the crank case. As shown in Fig. IV the outer surface of the inner sleeve 13 is provided with a spiral groove 30 extending from a point near its lower end upon which oil is splashed up to a point adjacent its upper end where it terminates in a peripheral groove 31. On the opposite side of the sleeve 13 another spiral groove 32 is formed which also leads from the lower portion of the sleeve and intersecting the grooves 29 as well as groove 31 terminates approximately midway between the groove 31 and the upper end of the sleeve. It will be observed that these grooves pass substantially midway between the gas ports formed in the sleeve.

Referring now to Fig. II showing the outer sleeve 12 it will be seen that this sleeve is provided on its outer surface, and at a point near its upper end with two peripheral grooves 34 and 35 which are connected by longitudinal grooves 36 extending on to the top of the sleeve. At the points of connection of the groove 34 into the grooves 36 holes 37 are provided through the sleeve wall.

The operation of the parts will now be described. With the engine crank shaft and the eccentric shaft 17 rotating in a clockwise direction lubricating oil is splashed against the lower outer surfaces of the two sleeves keeping their surfaces and the lower end of the spiral groove 30 covered with a film of oil. When the eccentric operating the inner sleeve 13 through the link 16 is at position A the sleeves 12 and 13 are in the position illustrated by Figs. I and VI in which position, it will be noted, the groove 31 in the inner sleeve is out of alinement with the holes 37 in the outer sleeve and the upper end of the groove 32 in the inner sleeve is covered by the outer sleeve. As the eccentric shaft 17 rotates in a clockwise direction to a new position B the two sleeves will have moved to the position indicated by Fig. VII. In this position the groove 31 has come into register with the holes 37 and a passageway thereby opened from the space 14 above the sleeves, to the crank case. Since both sleeves are moving downwardly just after their reaching this position a partial vacuum exists in the space 14 giving rise to a flow of oil or oil vapor up through the inlet groove 30 into the space 14. Upon further rotation of the eccentric shaft the inner sleeve moves down relative to the outer sleeve an amount sufficient to cause the groove 31 to pass out of register with the holes 37, but, upon still further rotation, the groove 31 again comes into register with the holes 37. This latter position is illustrated by Fig. VIII where the eccentric center for link 16 is in position C and the inner sleeve is at its lowest position. Oil splashed into the groove 30 is again drawn up into the space 14 as before until the inner sleeve moves up a sufficient distance to bring the groove 31 out of register with the holes 37. Upon reaching position D the inner sleeve is sufficiently higher than the outer sleeve to expose the upper end of the outlet groove 32. Both sleeves are now moving upward and the resulting pressure in the space 14 causes the oil contained therein to flow downwardly through the groove 32 distributing itself through the grooves 29 and over the entire outer surface of the inner sleeve and thence through holes 28 to the outer surface of the outer sleeve. Any surplus is delivered directly into the crank case on that side of the sleeves opposite to the side receiving the splash. The oil or oily vapor previously pumped into the space 14 also comes into contact with the inner surface of the inner sleeve and by reason of the proximity of the rings 24 and 25 effectually lubricates their outer surfaces.

Further rotation of the eccentric shaft brings the sleeves back to position A where the upper ends of both grooves 30 and 32 are covered by the outer sleeve thus completing the cycle of operations.

The two grooves 30 and 32 may obviously be cut parallel to the sleeve axis instead of spirally as shown and they may also be arranged on the face of the sleeve otherwise than as shown. A single groove 32 would suffice as the induction and eduction passages, or both grooves might terminate at the base where groove 30 terminates, that is on the side which receives most of the splash, so that there would be two grooves taking care of the flow of oil in both directions. However, the arrangement illustrated is preferred, as it is believed to distribute the oil quite evenly about the surfaces of the sleeves. Furthermore by locating the grooves between the inlet and the exhaust ports of the sleeves, a greater economy of oil results since a sufficient quantity of oil may be carried to the upper ends of the sleeves to provide for the proper lubrication of the cylinder head rings, sleeves and cylinder without loss of oil due to its being blown out of the ports.

For convenience of illustration the oil conducting grooves and passages are shown in Figs. VI to IX inclusive as in the same vertical plane with the engine ports. In practice, however, they are located at about 90° from the ports, as clearly indicated in Fig. IV.

While I have shown and described in detail a particular embodiment as illustrative of my invention, I do not wish to be limited thereby, since various changes might be made therein without departing from the scope of the invention covered by the appended claims.

Having thus described my invention, what I claim as new and desire to secure by Letters Patent, is:

1. An internal combustion engine comprising a crank case, a cylinder, a cylinder head, a reciprocating sleeve slidable therebetween and means whereby said sleeve serves to pump lubricant from said crank case upward inside the cylinder into the space above said sleeve between said cylinder and cylinder head.

2. An internal combustion engine comprising a crank case, a cylinder, a cylinder head, a pair of slidable sleeves extending between said cylinder and cylinder head and means whereby the joint motion of said sleeves draws lubricant from said crank case upward inside the cylinder into the space above said sleeve between said cylinder and cylinder head.

3. In an internal combustion engine having a pair of valve sleeves, means formed in one of said sleeves for conveying a lubricant to a point adjacent the top of said sleeve and apertured means formed in said other sleeve to cooperate with said first means for causing said lubricant to flow therein.

4. In an internal combustion engine comprising a cylinder, a cylinder head and a pair of valve sleeves therebetween, means formed in one of said sleeves for conveying lubricant upwardly, said means terminating adjacent the top of said sleeve and means on said other sleeve for covering and uncovering said first means.

5. In an internal combustion engine of the reciprocating sleeve valve type, means forming a passageway for lubricant upward from the crank-case longitudinally of the sleeves and apertured means cooperating with said first means to insure a positive flow of lubricant through said passageway.

6. An internal combustion engine comprising a cylinder, a cylinder head connected therewith at one portion and spaced therefrom at another portion to form an annular cavity, a pair of movable sleeves projecting into said cavity, a lubricant passage in one of said sleeves and means on said other sleeve for connecting and disconnecting said passage with said cavity.

7. An internal combustion engine comprising a cylinder, a cylinder head connected therewith at one portion and spaced therefrom at another portion thereby forming an annular cavity, and a pair of movable sleeves projecting into said cavity, one of said sleeves having lubricant conveying passages formed therein and the other of said sleeves having means for connecting and disconnecting said passages with said cavity.

8. An internal combustion engine comprising a cylinder, a cylinder head therefor having a portion spaced therefrom, a pair of sleeves mounted to slide in said space, one of said sleeves having a lubricant passage formed therein, and means whereby when said sleeves are in one position relative to each other lubricant may flow through said passage into said space and means whereby when said sleeves are in another relative position lubricant may flow through said passage out of said space.

9. An internal combustion engine having inner and outer contiguous valve controlling sleeves, one of said sleeves having a longitudinal groove formed on the face adjacent the other sleeve, the latter sleeve by its relative movement serving to cover and uncover the upper end of said groove.

10. An internal combustion engine having inner and outer valve controlling sleeves, said inner sleeve having a longitudinal grooved formed in its outer surface and said outer sleeve by its movement relative to said inner sleeve serving to alternately cover and expose the upper end of said groove.

11. In an internal combustion engine having a pair of valve sleeves and means for reciprocating the same, said sleeves having longitudinal grooves and openings therein effective in one position to draw up lubricant from the crank case of the engine and effective in another position to force down said lubricant.

12. In an internal combustion engine having a pair of valve sleeves and means for reciprocating the same, said sleeves having a longitudinal passage so arranged that when both sleeves are moving downwardly suction is created above them and that said passage is opened for lubricant to be sucked up therethrough, and when both sleeves are moving upwardly the passage is opened for lubricant to be forced downwardly therethrough.

13. An internal combustion engine having a pair of reciprocable valve sleeves, the inner sleeve having a pair of spiral grooves on opposite sides thereof extending from the base of said sleeve to a point adjacent its upper end, the outer sleeve having an opening adjacent its upper end adapted to periodically register with one of said grooves in the inner sleeve, and the upper end of said other groove being located so as to be uncovered periodically by said outer sleeve.

14. In an internal combustion engine, a cylinder having inlet and exhaust passages, a piston within the cylinder, an oil supply chamber, means movable longitudinally within the cylinder adapted to open and close said passages and to form a suction producing means for the oil splashed thereon to raise said oil to a space above said means, and operating means for said piston adapted to splash oil from said chamber upon said longitudinally movable means.

15. In an internal combustion engine, a cylinder having inlet and exhaust passages, a piston within the cylinder, an oil supply chamber, a plurality of valves for controlling said passages reciprocably mounted within the cylinder, said valves having cooperating grooves forming suction passages for lubricant deposited upon the valves to conduct the lubricant to the upper portions of the valves, and operating means for the piston movable within said chamber and adapted to splash oil upon the valves.

16. In an internal combustion engine, a crankcase adapted to contain a supply of lubricant, a cylinder having inlet and exhaust passages, a piston within the cylinder, a valve movable longitudinally within the cylinder, operating means for the valve and for the piston, said piston operating means being adapted to splash lubricant in the crank-case upon the valve, the latter having a longitudinal lubricant passage between its outer face and the inner face of the cylinder, and means for controlling the passage whereby the motion of the valve produces suction in the passage at regularly recurring periods.

17. In an internal combustion engine, a cylinder having inlet and exhaust ports, a head for the cylinder forming with the latter a suction chamber, and means reciprocally mounted within the cylinder and the chamber to control said ports and adapted also to function as a pump when moving within the chamber, said means having passageways adapted to receive a supply of lubricant through which the lubricant is forced by the pumping action of said means.

18. In an internal combustion engine, a cylinder having inlet and exhaust ports, a head for the cylinder forming with the latter a suction chamber, a valve for the ports having one end slidable within said chamber and provided with a groove extending from adjacent one of its ends to the other end, means adapted to supply lubricant to the end of the valve farthest from said chamber, the opposite end of the valve serving as a pump to cause the lubricant to flow through said groove toward said chamber, and means for actuating said valve.

19. In an internal combustion engine, a cylinder having inlet and exhaust ports, valve sleeves for said ports slidable one upon another, one of said sleeves having a passage for conveying lubricant longitudinally thereof and the other forming a suction producing member for drawing lubricant through said passage, a lubricant supply source with which one of the sleeves is adapted to communicate, and actuating means for the sleeves.

20. In an internal combustion engine, a cylinder having inlet and exhaust ports, and valve sleeves slidable one upon another for controlling said ports, said inner sleeve having a passage therein for conveying a lubricant upwardly from the lower end thereof and said outer sleeve being adapted to control the flow of lubricant in the passage of said inner sleeve.

21. In an internal combustion engine having a crank-case, a pair of reciprocating valve sleeves, means forming a passageway for lubricant on one of said sleeves, said passageway extending longitudinally of said sleeves and upwardly from said crank-case, and apertured means on the other of said sleeves cooperating with said first means for connecting said passageway with a source of lower pressure than the pressure within said crank-case.

22. In an internal combustion engine having a crank-case, a pair of reciprocating concentric valve sleeves, means forming a passageway extending longitudinally of said inner sleeve, upwardly from said crank-case and adapted to carry oil from said crank-case toward the top of said sleeve during the downward movement thereof, and means upon said outer sleeve for obstructing said passageway during upward movement of said inner sleeve.

23. In an internal combustion engine having a crank-case, a reciprocating valve sleeve, said valve having an oil groove therein extending longitudinally thereof upwardly from said crank-case and adapted to carry oil from said crank-case toward the top of said sleeve during the downward movement thereof and means for obstructing said groove during the upward movement of said sleeve.

24. In an internal combustion engine, a cylinder having inlet and exhaust ports, valve sleeves slidable one upon another for controlling said ports, one of said sleeves having a plurality of external grooves for conveying a lubricant, and the other of said sleeves having passages cooperating with said grooves and adapted to control the flow of lubricant within the same, whereby lubricant is permitted to flow upwardly in certain of said grooves and downwardly in certain other of said grooves.

25. In an internal combustion engine of the Knight type a crankcase a cylinder thereon, a sleeve valve therein having annular grooves thereon, said sleeve having a pair of longitudinal grooves thereon extending substantially the length of said sleeve and communicating with said annular grooves, means for depositing oil on the surface of said sleeve, means for alternately communicating suction to one longitudinal groove and pressure to the other longitudinal groove whereby oil deposited on said sleeve is drawn upwardly from said annular grooves through one longitudinal groove and forced downwardly through the other longitudinal groove to the crank case.

26. In an internal combustion engine of the Knight type a crank case a cylinder thereon a sleeve valve therein having annular grooves thereon, said sleeve having a pair of longitudinal grooves therein extending substantially the length of said sleeve and communicating with said annular grooves, means for depositing oil on the surface of said sleeve, means for alternately communicating suction to one longitudinal groove and pressure to the other longitudinal groove, whereby oil deposited on said sleeve is drawn upwardly from said annular grooves to the top of said sleeve through one longitudinal groove and forced downwardly through the other longitudinal groove to the crank case.

27. In an internal combustion engine, the combination of an engine-cylinder having intake and exhaust ports, movable sleeve means in said cylinder controlling said ports and having oil passage means, means to move said sleeve means, and means including said oil passage means to introduce lubricant intermittently into the sealing-head compartment of the engine.

28. In an internal combustion engine, the combination of an engine-cylinder having intake and exhaust ports, movable sleeve means in said cylinder controlling said ports and having oil passage means, means to move said sleeve means, and means including said oil passage means to remove lubricant intermittently from the sealing-head compartment of the engine.

29. In an internal combustion engine, the combination of an engine-cylinder having intake and exhaust ports, movable sleeve means in said cylinder controlling said ports and having oil passage means, means to move said sleeve means, means including oil passage means of said sleeve means to introduce lubricant intermittently into the sealing-head compartment of the engine, and means including oil passage means of said sleeve means to remove lubricant intermittently from said sealing-head compartment.

30. In an internal combustion engine, the combination of an engine-cylinder having intake and exhaust ports, movable sleeve means in said cylinder controlling said ports and having oil passage means, means to move said sleeve means, means including oil passage means of said sleeve means to introduce lubricant intermittently into the sealing-head compartment of the engine, and means including oil passage means of said sleeve means to remove lubricant intermittently from said sealing-head compartment during the periods said lubricant-introducing means is inactive.

WALTER S. FISHER.